(12) United States Patent
Takata et al.

(10) Patent No.: US 10,119,416 B2
(45) Date of Patent: Nov. 6, 2018

(54) MAIN STEAM VALVE AND STEAM TURBINE

(71) Applicant: MITSUBISHI HITACHI POWER SYSTEMS, LTD., Kanagawa (JP)

(72) Inventors: Tomoshige Takata, Tokyo (JP); Katsuhisa Hamada, Yokohama (JP); Kensuke Futahashi, Tokyo (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 0 days.

(21) Appl. No.: 15/517,784

(22) PCT Filed: Oct. 21, 2015

(86) PCT No.: PCT/JP2015/079697
§ 371 (c)(1),
(2) Date: Apr. 7, 2017

(87) PCT Pub. No.: WO2016/067995
PCT Pub. Date: May 6, 2016

(65) Prior Publication Data
US 2017/0306793 A1   Oct. 26, 2017

(30) Foreign Application Priority Data

Oct. 28, 2014 (JP) .................. 2014-219725

(51) Int. Cl.
*F16K 1/34* (2006.01)
*F01D 25/10* (2006.01)
(Continued)

(52) U.S. Cl.
CPC .......... *F01D 25/10* (2013.01); *F01D 17/085* (2013.01); *F01D 17/145* (2013.01); *F16K 1/34* (2013.01); *F16K 1/54* (2013.01); *F16K 47/08* (2013.01)

(58) Field of Classification Search
CPC ..... F16K 1/04; F16K 1/06; F16K 1/08; F16K 1/10; F16K 1/52; F16K 1/54; F16K 27/02;
(Continued)

(56) References Cited

U.S. PATENT DOCUMENTS 2,090,381 A * 8/1937 Zagorski ................... F16K 1/10
251/118
2,621,015 A * 12/1952 Macgregor ............... F16K 1/06
251/118
(Continued)

FOREIGN PATENT DOCUMENTS

CN   101165319   4/2008
CN   202545864   11/2012
(Continued)

OTHER PUBLICATIONS

International Search Report dated Jan. 26, 2016 in International Application No. PCT/JP2015/079697 (with English translation).
(Continued)

*Primary Examiner* — Ian Paquette
(74) *Attorney, Agent, or Firm* — Wenderoth, Lind & Ponack, L.L.P.

(57) ABSTRACT

A main steam valve includes a cylindrical guide centered about an O-axis, a valve body disposed inside the guide so as to be slidable in the O-axis direction, a valve shaft on which the valve body moves in the O-axis direction between open and closed positions, and a casing having a flow path and a valve seat formed on an inner surface thereof. The flow path guides out a fluid guided into the casing from the inflow direction along the O-axis direction. The valve body abuts against the valve seat when the valve body is in the closed position. A valve chamber, formed in the casing, has a baffle plate provided in a region between an outer circumferential surface of the guide and an inner surface of the casing. The
(Continued)

baffle plate interrupts swirling vortex flow with spiral vortex core extending in the circumferential direction of the O-axis of the guide.

11 Claims, 8 Drawing Sheets

(51) Int. Cl.
- *F16K 1/54* (2006.01)
- *F16K 47/08* (2006.01)
- *F01D 17/08* (2006.01)
- *F01D 17/14* (2006.01)

(58) Field of Classification Search
CPC .......... F16K 47/00; F16K 47/02; F16K 47/04; F16K 47/08; F16K 1/34; F01D 25/10; F01D 17/085
USPC ........................................... 251/127
See application file for complete search history.

(56) References Cited

U.S. PATENT DOCUMENTS

| | | | |
|---|---|---|---|
| 3,286,979 A * | 11/1966 | Brown | F16K 1/06 137/549 |
| 4,366,833 A | 1/1983 | Grotloh | |
| 7,467,641 B2 * | 12/2008 | Del Castillo Miro | F16K 1/04 137/375 |
| 7,604,021 B2 | 10/2009 | Ootomo et al. | |
| 2005/0268973 A1 | 12/2005 | Ootomo et al. | |
| 2008/0251140 A1 | 10/2008 | Shindo | |

FOREIGN PATENT DOCUMENTS

| | | |
|---|---|---|
| CN | 103016813 | 4/2013 |
| JP | 58-122304 | 7/1983 |
| JP | 2004-28195 | 1/2004 |
| JP | 2004-150317 | 5/2004 |
| JP | 4230751 | 2/2009 |
| JP | 2012-112270 | 6/2012 |
| WO | 2012/070269 | 5/2012 |

OTHER PUBLICATIONS

Written Opinion of the International Searching Authority dated Jan. 26, 2016 in International Application No. PCT/JP2015/079697 (with English translation).

* cited by examiner

MAIN STEAM VALVE AND STEAM TURBINE

TECHNICAL FIELD

The present invention relates to a main steam valve provided in a steam pipe line of a steam turbine and the like, and to a steam turbine.

This application claims priority based on Japanese Patent Application No. 2014-219725 filed in Japan on Oct. 28, 2014, of which the contents are incorporated herein by reference.

BACKGROUND ART

In a steam pipe line of a steam turbine and the like provided in a power generation facility and the like, a main steam valve is provided. The main steam valve is configured to adjust the flow rate of fluid (steam) to be supplied and to stop the supply of the fluid.

The main steam valve is provided with a casing having a flow path of the fluid formed therein and a valve body provided so as to be movable along an axis inside the flow path. In the flow path formed inside the casing, a valve seat is formed that can be closed by the valve body. The valve body moves toward a first side in an axis direction to approach the valve seat, and the valve body moves toward a second side in the axis direction to separate away from the valve seat. This configuration changes a flow path area of a gap between the valve body and the valve seat to adjust the flow rate of the fluid.

Patent Document 1 discloses a main steam valve that is further provided with a strainer housed inside the casing and a shielding plate provided on a side surface of the strainer. On the outer circumferential surface of the strainer, a plurality of minute holes are provided, through which the fluid passes. The fluid, which has flowed in from a main steam inlet, flows along the outer circumferential surface of the strainer, and at the same time, passes through the holes and flows from the outer side toward the inner side of the strainer. Then, the fluid, which has flowed into the inner side of the strainer, flows toward a main steam outlet that is open in a direction that intersects the main steam inlet. Here, as a result of the fluid flowing while curving at an acute angle, a secondary flow is generated, and further, a swirling vortex flow is generated as a result of separate fluid flowing into a velocity defect component of this secondary flow. In response to this, in Patent Document 1, the shielding plate provided on the side surface of the strainer controls the flow of the fluid in the strainer, thereby suppressing the generation of the swirling vortex flow.

CITATION LIST

Patent Document

Patent Document 1: Japanese Unexamined Patent Application Publication No. 2004-150317A

SUMMARY OF INVENTION

Technical Problem

However, in the main steam valve disclosed in the above-described Patent Document 1, the swirling vortex flow may be generated near the outer circumferential surface of the valve body on which the shielding plate is not provided. When such a swirling vortex flow is generated in the flow path, a loss in the kinetic energy of the fluid occurs, and a pressure loss in the main steam valve may increase. This results in a deterioration in efficiency of the steam turbine and the like, to which the fluid is supplied.

In light of the foregoing, the present invention provides a main steam valve that suppresses an increase in pressure loss by weakening a swirling vortex flow generated in a flow path, and a steam turbine.

Solution to Problem

In order to solve the above-described problem, the present invention provides the following means.

According to a first aspect of the present invention, a main steam valve includes: a cylindrical guide extending centered about an axis; a valve body disposed inside the guide so as to be slidable in an axis direction; a valve shaft on which the valve body moves in the axis direction between an open position and a closed position; a casing having a flow path formed therein and having a valve seat formed on an inner surface thereof, the flow path guiding out, in an outflow direction that intersects an inflow direction, a fluid guided into the casing from the inflow direction along the axis direction, the valve body abutting against the valve seat when the valve body is in the closed position; and a valve chamber formed inside the casing. The valve chamber has a baffle plate provided in a region between the outer circumferential surface of the guide and the inner surface of the casing. The baffle plate interrupts a swirling vortex flow with a vortex core that extends in a circumferential direction of the axis of the guide.

According to such a main steam valve, the swirling vortex flow generated in the flow path is interrupted by the baffle plate. This configuration can inhibit the swirling vortex flow from joining up in the flow path and achieve an effect of weakening the swirling vortex flow. As a result, a loss in the kinetic energy of the fluid caused by the swirling vortex flow can be reduced, and an increase in pressure loss can thus be suppressed.

According to a second aspect of the present invention, the baffle plate may include a first plate portion that extends in the outflow direction of the fluid in a region that is between the outer circumferential surface of the guide and the inner surface of the casing and that is on an opposite side in the outflow direction of the fluid.

This configuration causes the swirling vortex flow generated in the flow path to be interrupted by the first plate portion, which makes it possible to inhibit the swirling vortex flow from joining up in the flow path and achieve an effect of weakening the swirling vortex flow. As a result, a loss in the kinetic energy of the fluid caused by the swirling vortex flow can be reduced, and an increase in pressure loss can thus be suppressed. Further, as a result of the first plate portion being provided in the valve chamber on the opposite side in the outflow direction of the fluid, the swirling vortex flow can be weakened without causing a main flow of the fluid to be unbalanced.

According to a third aspect of the present invention, with respect to the above-described second aspect, an end portion of the first plate portion on an inner side in a radial direction may form a gap with the outer circumferential surface of the guide.

This configuration can suppress a development of the swirling vortex flow in the flow path, and can weaken the swirling vortex flow. In addition, causing the fluid to pass through the gap between the first plate portion and the outer circumferential surface of the guide can further reduce the possibility of the main flow of the fluid becoming unbalanced.

According to a fourth aspect of the present invention, with respect to the above-described third aspect, the end portion of the first plate portion on the inner side in the radial direction may be inclined so as to be closer to the outer circumferential surface of the guide toward a deep side in the inflow direction.

This configuration can suppress the development of the swirling vortex flow on the deep side in the inflow direction of the fluid, and can cause the main flow of the fluid to pass through on a near side in the inflow direction. Further, the swirling vortex flow is elongated in the circumferential direction, reducing the density of the vortex. As a result, the swirling vortex flow can be weakened.

According to a fifth aspect of the present invention, with respect to the above-described third aspect, the end portion of the first plate portion on the inner side in the radial direction may be inclined so as to separate further away from the outer circumferential surface of the guide toward the deep side in the inflow direction.

This configuration can suppress the development of the swirling vortex flow on the near side in the inflow direction of the fluid, and can cause the main flow of the fluid to pass through on the deep side in the inflow direction. Further, the swirling vortex flow is elongated in the circumferential direction, reducing the density of the vortex. As a result, the swirling vortex flow can be weakened.

According to a sixth aspect of the present invention, with respect to any one of the above-described second to fifth aspects, the baffle plate may include a second plate portion that extends in a direction orthogonal to the axis direction, in a width direction that intersects the inflow direction and the outflow direction of the fluid, in the region of the valve chamber between the outer circumferential surface of the guide and the inner surface of the casing.

This configuration causes the swirling vortex flow to be interrupted in the width direction of the valve chamber, which makes it possible to inhibit the swirling vortex flow from joining up in the flow path and achieve the effect of weakening the swirling vortex flow. As a result, a loss in the kinetic energy of the fluid caused by the swirling vortex flow can be reduced, and an increase in pressure loss can thus be suppressed.

According to a seventh aspect of the present invention, with respect to the above-described sixth aspect, the second plate portion may include at least one of a near-side plate portion formed only on the near side in the inflow direction of the fluid or a deep-side plate portion formed only on the deep side in the inflow direction of the fluid.

This configuration causes the swirling vortex flow generated in a fluid flow path to be deformed by the second plate portion so as to be elongated in the outflow direction of the fluid. Thus, the swirling vortex flow can be weakened. As a result, a loss in the kinetic energy of the fluid caused by the swirling vortex flow can be reduced, and an increase in pressure loss can thus be suppressed. Further, the main flow of the fluid can pass through the deep side of the near-side plate portion and the near side of the deep-side plate portion. As a result, the increase in pressure loss, which is caused by the main flow of the fluid being impeded, can be suppressed.

According to an eighth aspect of the present invention, with respect to the above-described seventh aspect, the near-side plate portion may be provided on one side in the circumferential direction of the axis with respect to a position at which the first plate portion is disposed, and the deep-side plate portion may be provided on the other side in the circumferential direction of the axis with respect to the position at which the first plate portion is disposed.

This configuration elongates the swirling vortex flow in the circumferential direction, reducing the density of the vortex. Specifically, the swirling vortex flow can be weakened.

According to a ninth aspect of the present invention, with respect to the above-described eighth aspect, the near-side plate portion and the deep-side plate portion may be formed such that positions thereof partially overlap with each other in the axis direction.

This configuration can elongate the swirling vortex flow even longer in the circumferential direction, which makes it possible to further weaken the swirling vortex flow.

According to a tenth aspect of the present invention, with respect to the above-described eighth aspect, the near-side plate portion and the deep-side plate portion may be formed such that positions thereof do not overlap with each other in the axis direction.

This configuration can elongate the swirling vortex flow in the circumferential direction, and can reduce the possibility of an impact on the main flow of the fluid.

According to an eleventh aspect of the present invention, with respect to the above-described sixth or seventh aspect, the second plate portion may be provided at a position in the circumferential direction around the axis within a range from 45° to 130° with respect to a position at which the first plate portion is disposed.

This configuration elongates the swirling vortex flow in the circumferential direction, reducing the density of the vortex. Specifically, the swirling vortex flow can be weakened.

According to a twelfth aspect of the present invention, with respect to any one of the above-described sixth to eighth aspects, the second plate portion may be provided at a position in the circumferential direction around the axis within a range from 80° to 100° with respect to the position at which the first plate portion is disposed.

This configuration further elongates the swirling vortex flow in the circumferential direction, reducing the density of the vortex. Specifically, the swirling vortex flow can be further weakened.

According to a thirteenth aspect of the present invention, with respect to any one of the above-described sixth to ninth aspects, the second plate portion may be provided at a position in the circumferential direction around the axis that is at 90° with respect to the position at which the first plate portion is disposed.

This configuration elongates the swirling vortex flow in the circumferential direction to the greatest extent, reducing the density of the vortex. Specifically, the swirling vortex flow can be weakened to the greatest extent.

Further, according to a fourteenth aspect of the present invention, a steam turbine is provided with the main steam valve according to any one of the first to thirteenth aspects.

This configuration can minimize an impact on the main flow of the fluid in the main steam valve, and can suppress the generation of the swirling vortex flow in the flow path of the main steam valve. The steam turbine provided with such a main steam valve can suppress an increase in pressure loss in the main steam valve, which suppresses a deterioration in the efficiency of the steam turbine.

Advantageous Effects of Invention

According to the present invention, weakening the swirling vortex flow generated in the flow path enables the increase in the pressure loss to be suppressed.

DESCRIPTION OF EMBODIMENTS

First Embodiment

Hereinafter, a main steam valve 1 according to the first embodiment of the present invention will be described with reference to the drawings.

Figure 1:
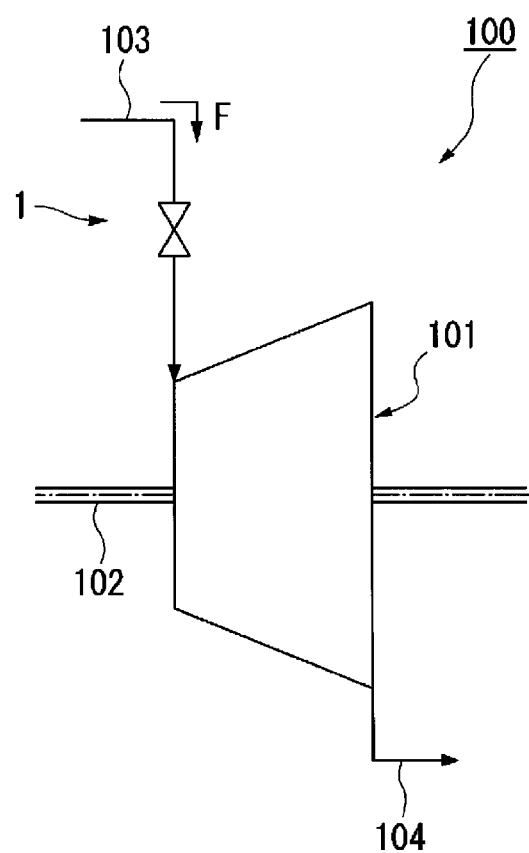
FIG. 1 is a schematic view of a steam turbine plant according to embodiments of the present invention.

As illustrated in FIG. 1, a steam turbine plant 100 is provided with a rotor 102 that rotates about an axis, a steam turbine 101 that is connected to the rotor 102, a steam supply pipe 103 that supplies fluid (steam) F from a steam supply source (not illustrated) to the steam turbine 101, and a steam discharge pipe 104 that is connected to the downstream side of the steam turbine 101 and discharges the steam.

The steam supply pipe 103 includes the main steam valve 1 that adjusts a flow amount of the fluid F flowing through the interior of the steam supply pipe 103.

The main steam valve 1 is a device for adjusting the flow rate of the fluid F supplied to the steam turbine 101 and for stopping the supply of the fluid F.

Figure 2:
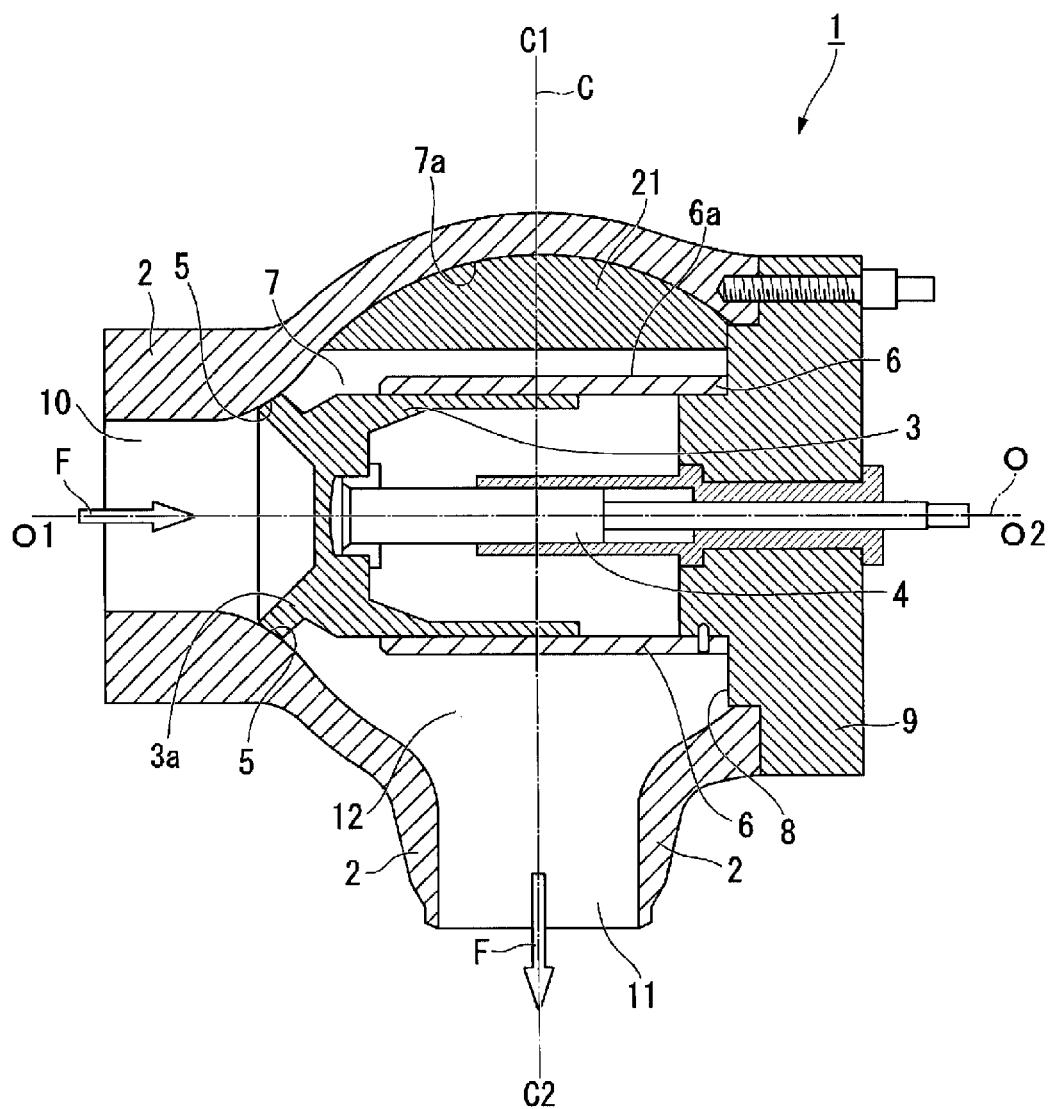
FIG. 2 is a cross-sectional view of a main steam valve according to the embodiments of the present embodiment.

FIG. 2 is a cross-sectional view of the main steam valve 1 according to the present embodiment.

In the description below, an axis O extends along an inflow direction (the left-right direction in FIG. 2) of the fluid F, and an inflow side of the fluid F is referred to as a first end O1 (the left side in FIG. 2) of the axis O, while the opposite side in the inflow side of the fluid F is referred to as a second end O2 (the right side in FIG. 2) of the axis O. Further, a cross line C extends in an outflow direction (the up-down direction in FIG. 2) of the fluid F that intersects the axis O. The opposite side in the outflow direction of the fluid F is referred to as a first end C1 (the upper side in FIG. 2) of the cross line C, and the outflow side of the fluid F is referred to as a second end C2 (the lower side in FIG. 2) of the cross line C. Furthermore, a direction that intersects the axis O and the cross line C (the up-down direction in FIG. 3) is referred to as a width direction. Note that, although the cross line C is orthogonal to the axis O in the present embodiment, the cross line C need not necessarily be orthogonal to the axis O, and it is sufficient that the cross line C intersects the axis O so as to form an angle with respect to the axis O.

As illustrated in FIG. 2, the main steam valve 1 is provided with a casing 2, a valve body 3, and a valve shaft 4.

The casing 2 includes a valve chamber 7 inside which the valve body 3 is housed, an inflow port 10 and an outflow port 11 that communicate with the valve chamber 7, and an opening 8 that faces the inflow port 10 with the valve chamber 7 interposed therebetween.

An inner circumferential surface 7a of the valve chamber 7 is formed in a substantially concave spherical shape. The valve chamber 7 is open toward the first end O1 in the axis O direction and communicates with the inflow port 10. Further, the valve chamber 7 is open toward the second end C2 on the cross line C and communicates with the outflow port 11.

The inflow port 10 has a cross-section that is orthogonal to the axis O and has a circular shape centered about the axis O. The inflow port 10 has a smaller inner diameter than that of the valve chamber 7. Steam piping and the like (not illustrated) are connected to the inflow port 10.

On the inner surface of the casing 2 extending from the inflow port 10 to the inner circumferential surface 7a of the valve chamber 7, a valve seat 5 is formed in which the inner diameter (the cross-sectional area) of the inflow port 10 gradually increases toward the second end O2 in the axis O direction.

The outflow port 11 has a cross-section that is orthogonal to the cross line C and has a circular shape centered about the cross line C. The outflow port 11 has a smaller inner diameter than that of the valve chamber 7. Steam piping and the like (not illustrated) is connected to the outflow port 11.

In this way, in the casing 2, a fluid flow path 12 is formed continuously from the inflow port 10 to the outflow port 11 via the valve chamber 7.

The opening 8 is formed on the second end O2 side in the axis O direction of the casing 2. A holding member 9 is mounted to the opening 8. The holding member 9 closes the opening 8 and holds the valve body 3. In the holding member 9, a cylindrical guide 6 is formed centered about the axis O and extends toward the first end O1 in the axis O direction. The valve body 3 is formed in a cylindrical shape that extends in the axis O direction. The valve body 3 is inserted into the guide 6 such that the outer circumferential surface of the valve body 3 can slide, in the axis O direction, with respect to the inner circumferential surface of the guide 6. On the first end O1 side in the axis O direction, the valve body 3 includes a valve head portion 3a that can close the valve seat 5 of the valve chamber 7.

The valve shaft 4 has a circular pillar shape that extends in the axis O direction, and a tip end portion of the valve shaft 4 on the first end O1 side in the axis O direction is fixed to a central portion of the valve head portion 3a. A tip end of the valve shaft 4 on the second end O2 side in the axis O direction protrudes to the outside of the valve chamber 7, and is connected to an actuator (not illustrated). This actuator enables the valve shaft 4 to move back and forth along the axis O.

Figure 3:
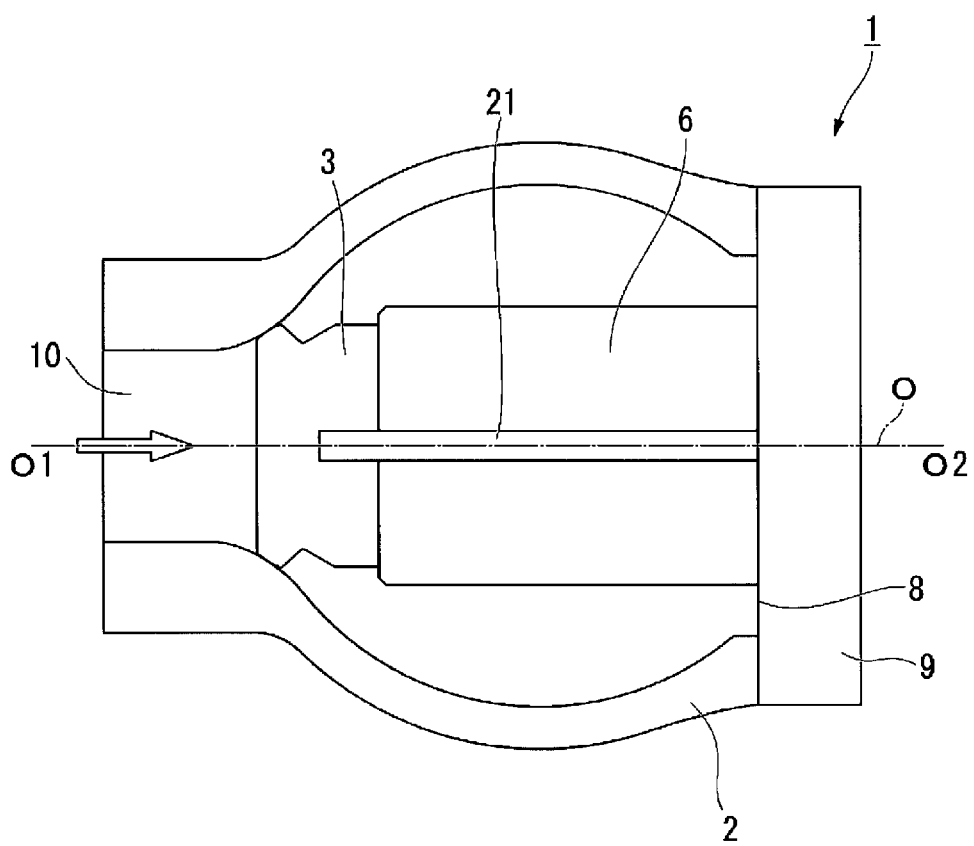
FIG. 3 is a schematic view illustrating the interior of a valve chamber of a main steam valve according to the first embodiment of the present invention.

As illustrated in FIGS. 2 and 3, a first plate portion (a baffle plate) 21 having a planar shape is provided on the inner circumferential surface 7a of the valve chamber 7, in a region on the first end C1 side in the cross line C direction (a region of the valve chamber 7 on the opposite side in the outflow direction of the fluid F). In the present embodiment, the first plate portion 21 is formed in the planar shape that extends along a plane including the axis O and the cross line C. This first plate portion 21 is formed such that an end portion thereof located on the outer side in the radial direction of the axis O is formed in a shape that follows a curved surface of the inner circumferential surface 7a of the valve chamber 7. This configuration brings the end portion of the first plate portion 21 on the outer side in the radial direction into close contact with the inner circumferential surface 7a of the valve chamber 7 over the entire region in the axis O direction. Further, an end portion of the first plate portion 21 oriented inward in the radial direction is formed in a linear shape parallel to the axis O, and has a gap with the guide 6 in the cross line C direction.

In other words, the first plate portion 21 is provided so as to project from the inner circumferential surface 7a of the valve chamber 7 inwardly in the radial direction of the axis O and to form a gap between the projected end portion and the guide 6.

As illustrated in FIG. 2, in a fully closed state (a closed position) in which the valve head portion 3a of the valve body 3 abuts against the valve seat 5 of the valve chamber, the fluid F does not flow into the main steam valve 1. Therefore, the fluid F is also not supplied to a steam turbine and the like (not illustrated) connected to the downstream side of the main steam valve 1.

Here, the actuator (not illustrated) causes the valve shaft 4 to move toward the second end O2 in the axis O direction, so that the valve body 3 moves toward the second end O2 in the axis O direction together with the valve head portion 3a connected to the valve shaft 4. As a result, the fluid F flows between the valve head portion 3a and the valve seat 5, resulting in a slightly open state in which the inflow port 10 and the valve chamber 7 communicate with each other. Causing the valve body 3 to move further toward the second end O2 in the axis O direction together with the valve shaft 4 leads to an open state (an open position). In the slightly open state and in the open state, the fluid flow path 12 is formed through which the fluid F is guided into the valve chamber 7 from the inflow port 10 through a gap between the valve head portion 3a and the valve seat 5, and guided out from the outflow port 11 through a gap between the inner circumferential surface 7a of the valve chamber and the outer circumferential surface 6a of the guide 6. The fluid F that has flowed out from the outflow port 11 is supplied to the steam turbine and the like (not illustrated) connected to the downstream side of the main steam valve 1.

In this way, the main steam valve 1 can appropriately adjust the flow rate of the fluid F by increasing and decreasing the flow rate of the fluid F flowing between the valve head portion 3a and the valve seat 5 in accordance with a movement amount of the valve body 3 in the axis O direction.

In the slightly open state and in the open state, the fluid F that has flowed in through a gap between the valve head portion 3a and the valve seat 5 flows toward the second end O2 in the axis O direction along the inner circumferential surface 7a of the valve chamber 7. The fluid F that has flowed along the inner circumferential surface 7a of the valve chamber 7 next flows along the opening 8, and then flows along the guide 6 toward the first end O1 in the axis O direction. The fluid F that has flowed toward the first end O1 in the axis O direction is pushed by fluid F newly flowing in from the inflow port 10, and once again flows toward the second end O2 in the axis O direction. Continuous occurrence of such a flow generates a swirling vortex flow that swirls around a vortex core extending in the circumferential direction of the axis O. Note that the direction in which the vortex core extends is not limited to the direction orthogonal to the axis O, and the direction may be a direction that intersects the axis O so as to form an angle with respect to the axis O.

Here, with a main steam valve in which the first plate portion 21 is not provided, in the region of the valve chamber 7 on the first end C1 side in the cross line C direction, the swirling vortex flow generated in the above-described manner passes between the inner circumferential surface 7a of the valve chamber 7 and the outer circumferential surface 6a of the guide 6, and flows toward the outflow port 11. As a result, a loss occurs in the kinetic energy of the fluid F in the valve chamber 7, which may increase a pressure loss.

However, in the present embodiment, because the first plate portion 21 is formed, the swirling vortex flow can be interrupted in the region of the valve chamber 7 on the first end C1 side in the cross line C direction. In this way, the swirling vortex flow generated in the fluid flow path 12 can be weakened. As a result, the loss in the kinetic energy of the fluid F can be reduced in the main steam valve, and an effect of suppressing an increase in the pressure loss can be obtained.

Further, in the present embodiment, the first plate portion 21 is provided so as to project from the inner circumferential surface 7a of the valve chamber 7 inwardly in the radial direction of the axis O and to form a gap between the projected end portion and the guide 6.

As a result, the development of the swirling vortex flow can be suppressed, and the swirling vortex flow can thus be weakened. In addition, causing the fluid to pass through the gap between the first plate portion 21 and the outer circumferential surface 6a of the guide 6 can further reduce the possibility of the main flow of the fluid becoming unbalanced.

In the present embodiment, a configuration has been described above in which the end portion of the first plate portion 21 oriented inward in the radial direction forms a linear shape parallel to the axis O. However, the first plate portion 21 is not limited to this configuration. For example, as illustrated in FIGS. 4 and 5, the end portion of the first plate portion 21 oriented inward in the radial direction may be provided so as to be inclined in the width direction with respect to the axis O direction.

Figure 4:
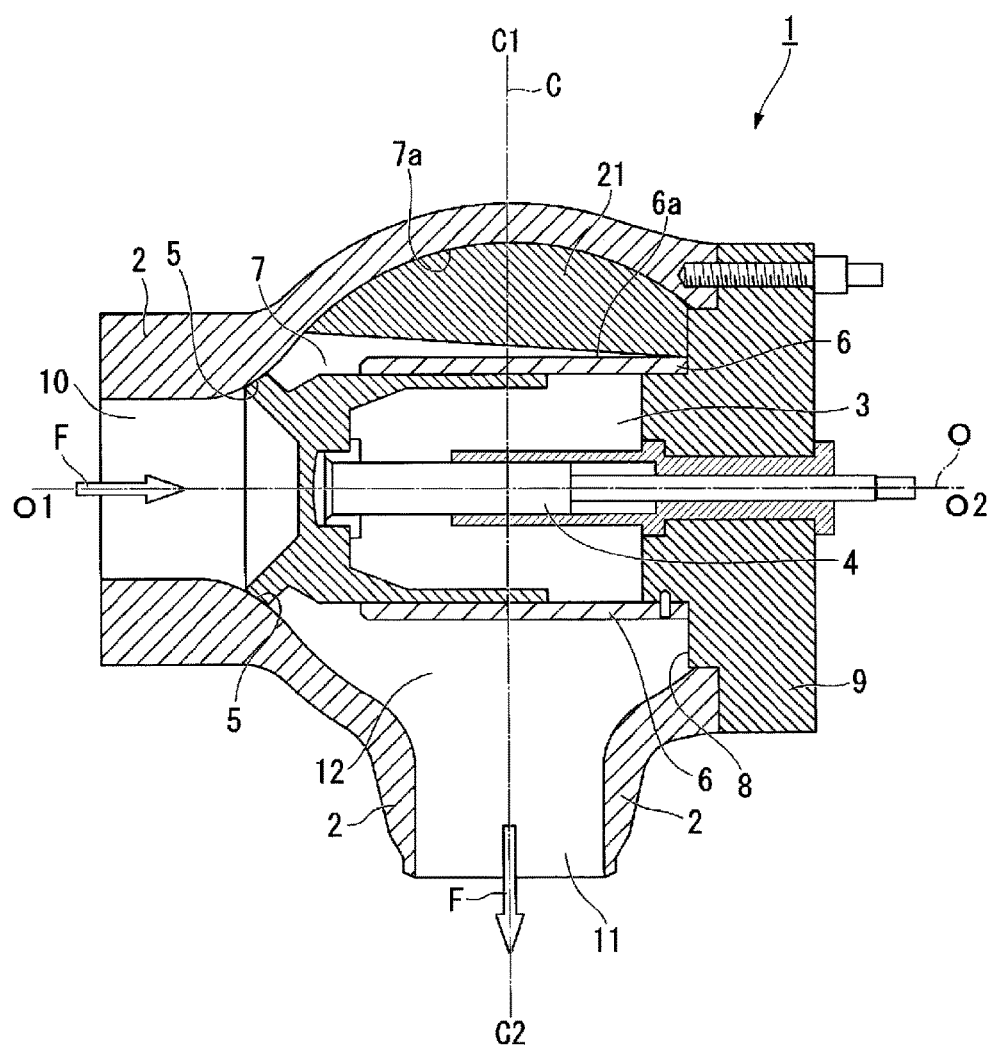
FIG. 4 is a diagram illustrating a modified example of the main steam valve according to the first embodiment of the present invention.

In the example in FIG. 4, the end portion of the first plate portion 21 oriented inward in the radial direction is inclined so as to be closer to the outer circumferential surface of the guide 6 toward a deep side in the inflow direction of the fluid. This configuration can suppress the development of the swirling vortex flow on the deep side in the inflow direction of the fluid and cause the main flow of the fluid to pass through on a near side in the inflow direction. Further, the swirling vortex flow is elongated in the circumferential direction, reducing the density of the vortex. More specifically, the swirling vortex flow can be interrupted in the region of the valve chamber 7 on the first end C1 side in the cross line C direction, and the swirling vortex flow can thus be weakened. As a result, the loss in the kinetic energy of the fluid F caused by the swirling vortex flow can be reduced, and the increase in the pressure loss can be suppressed.

Figure 5:
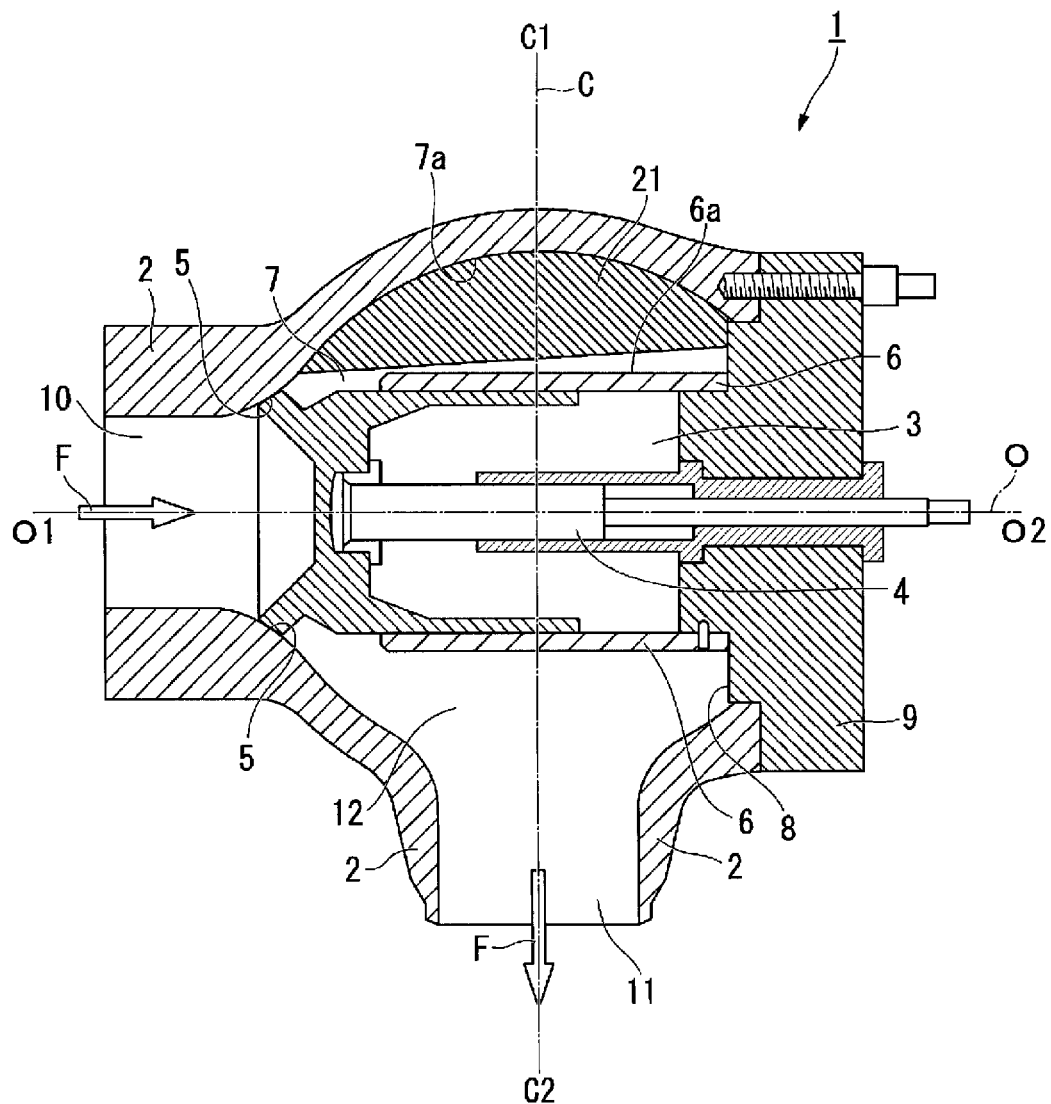
FIG. 5 is a diagram illustrating another modified example of the main steam valve according to the first embodiment of the present invention.

Meanwhile, as illustrated in FIG. 5, the end portion of the first plate portion 21 oriented inward in the radial direction may be inclined so as to separate further away from the outer circumferential surface of the guide 6 toward the deep side in the inflow direction of the fluid. This configuration can also suppress the development of the swirling vortex flow on the near side in the inflow direction of the fluid and cause the main flow of the fluid to pass through on the deep side in the inflow direction. Further, the swirling vortex flow is elongated in the circumferential direction, reducing the density of the vortex. As a result, the swirling vortex flow can be weakened.

Second Embodiment

Next, the main steam valve 1 according to a second embodiment of the present invention will be described with reference to FIG. 6.

In the second embodiment, the same components as those in the first embodiment are denoted by the same reference signs, and a detailed description thereof is omitted.

The present embodiment is different from the first embodiment in that the main steam valve 1 includes a second plate portion 22 (baffle plates) each having a planar shape.

Figure 6:
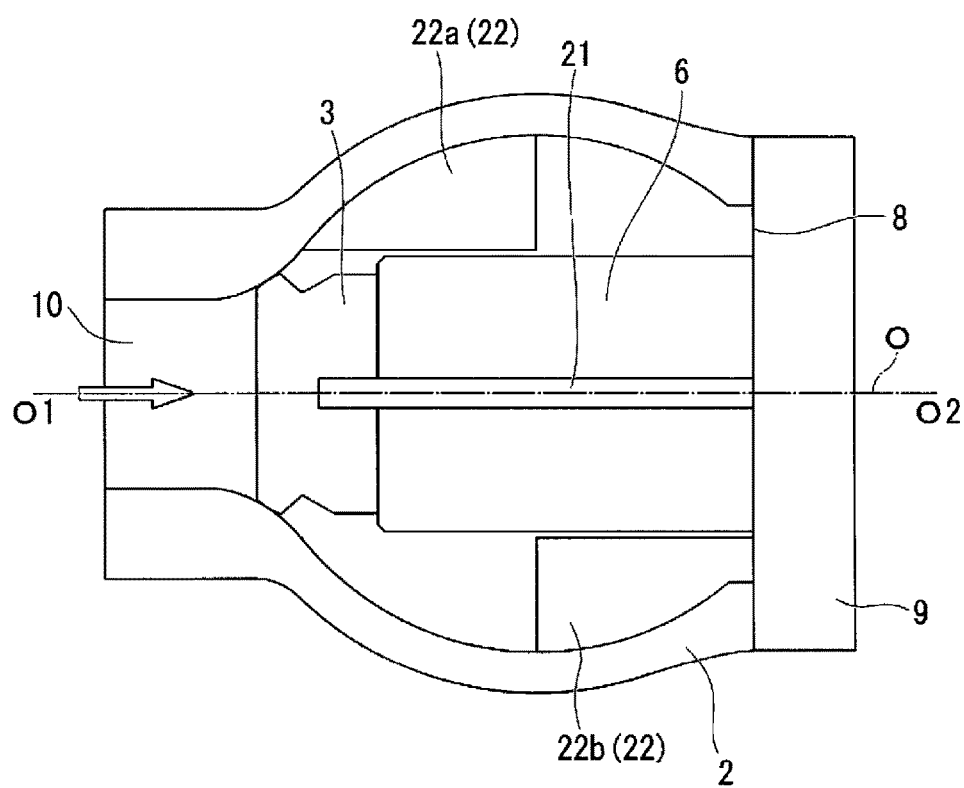
FIG. 6 is a diagram illustrating a main steam valve according to the second embodiment of the present invention.

In the present embodiment, as illustrated in FIG. 6, the second plate portion 22 having the planar shape is provided on the inner circumferential surface 7a, both in a region on one side of the valve chamber 7 in the width direction (the upper side in FIG. 4) and in a region on the other side in the width direction (the lower side in FIG. 6). The second plate portion 22 is constituted of a near-side plate portion 22a and a deep-side plate portion 22b. The near-side plate portion 22a and the deep-side plate portion 22b each have a planar shape that extends along a plane including the axis O and orthogonal to the cross line C. The near-side plate portion 22a is provided on the one side of the valve chamber 7 in the width direction. The near-side plate portion 22a is formed continuously from the first end O1 side in the axis O direction to near the center of the valve chamber 7 along the axis O, and extends toward the other side of the valve chamber 7 in the width direction so as to form a gap with the guide 6. The deep-side plate portion 22b is provided on the other side of the valve chamber 7 in the width direction. The deep-side plate portion 22b is formed continuously from the second end O2 side in the axis O direction to near the center of the valve chamber 7 along the axis O, and extends toward the one side of the valve chamber 7 in the width direction so as to form a gap with the guide 6.

This configuration causes the near-side plate portion 22a and the deep-side plate portion 22b to interrupt, in the width direction of the valve chamber 7, the swirling vortex flow generated in the fluid flow path 12. As a result, the swirling vortex flow can be inhibited from joining up in the regions on the one side and the other side of the valve chamber 7 in the width direction. In this way, the swirling vortex flow generated in the fluid flow path 12 can be weakened. As a result, the loss in the kinetic energy of the fluid F can be reduced in the main steam valve, and an effect of suppressing an increase in the pressure loss can be obtained.

Further, the near-side plate portion 22a is formed, along the axis O, extending from the first end O1 side to near the center of the valve chamber 7 in the axis O direction. However, the near-side plate portion 22a is not formed in a region extending from near the center of the valve chamber 7 to the second end O2 side in the axis O direction. Thus, the main flow of the fluid F can pass through the second end O2 side of the valve chamber 7 in the axis O direction. As a result, an increase in pressure loss, the pressure loss being caused by the main flow of the fluid F being impeded, can be suppressed. Further, the deep-side plate portion 22b is formed, along the axis O, extending from the second end O2 side to near the center of the valve chamber in the axis O direction. However, the deep-side plate portion 22b is not formed in a region extending from near the center of the valve chamber 7 to the first end O1 side in the axis O direction. Thus, in the width direction of the valve chamber 7, the fluid F tries to pass through those regions in which the near-side plate portion 22a and the deep-side plate portion 22b are not provided. As a result, the swirling vortex flow generated in the fluid flow path 12 is deformed so as to be elongated in an axis C direction in the regions on the one side and the other side of the valve chamber 7 in the width direction. In this way, the swirling vortex flow generated in the fluid flow path 12 can be weakened. Further, because the main flow of the fluid F can pass through the first end O1 side of the valve chamber 7 in the axis O direction, the increase in pressure loss, the pressure loss being caused by the main flow of the fluid F being impeded, can be suppressed. Furthermore, providing the second plate portion 22 in different positions on the one side and on the other side in the width direction, namely, on the near side and the deep side in the inflow direction of the fluid F can cause the swirling vortex flow to be inhibited from flowing in an unbalanced manner, that is, flowing only on the near side or the deep side in the inflow direction of the fluid F. As a result, the increase in pressure loss, the pressure loss being caused by the development of the swirling vortex flow, can be suppressed.

In the present embodiment, a configuration has been described above in which the second plate portion 22 is constituted of the near-side plate portion 22a provided on the one side in the width direction, and the deep-side plate portion 22b provided on the other side in the width direction. However, the present invention is not limited to this configuration. The second plate portion 22 may be constituted of a deep-side plate portion 22b provided on the one side in the width direction, and a near-side plate portion 22a provided on the other side in the width direction. Further, the second plate portions 22 may be constituted of either one of the near-side plate portion 22a and the deep-side plate portion 22b provided on one of the one side or the other side in the width direction. Furthermore, the second plate portions 22 may be constituted of a plurality of the near-side plate portions 22a and the deep-side plate portions 22b. Further, positions of the near-side plate portion 22a and the deep-side plate portion 22b in the cross line C direction may be different from each other on the one side and the other side in the width direction. This configuration can also achieve the same effect as described above.

Figure 7:
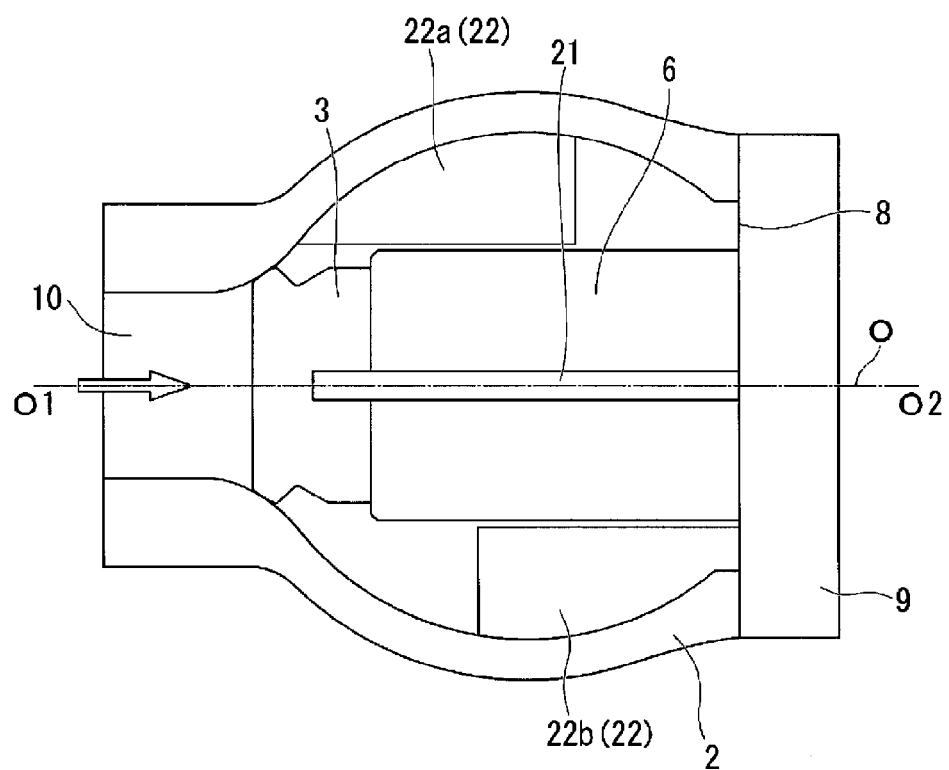
FIG. 7 is a diagram illustrating a modified example of the main steam valve according to the second embodiment of the present invention.

More specifically, as illustrated in FIG. 7, the near-side plate portion 22a and the deep-side plate portion 22b may partially overlap with each other in the cross line C direction. This configuration can elongate the swirling vortex flow in the circumferential direction of the cross line C, which makes it possible to further weaken the swirling vortex flow.

Figure 8:
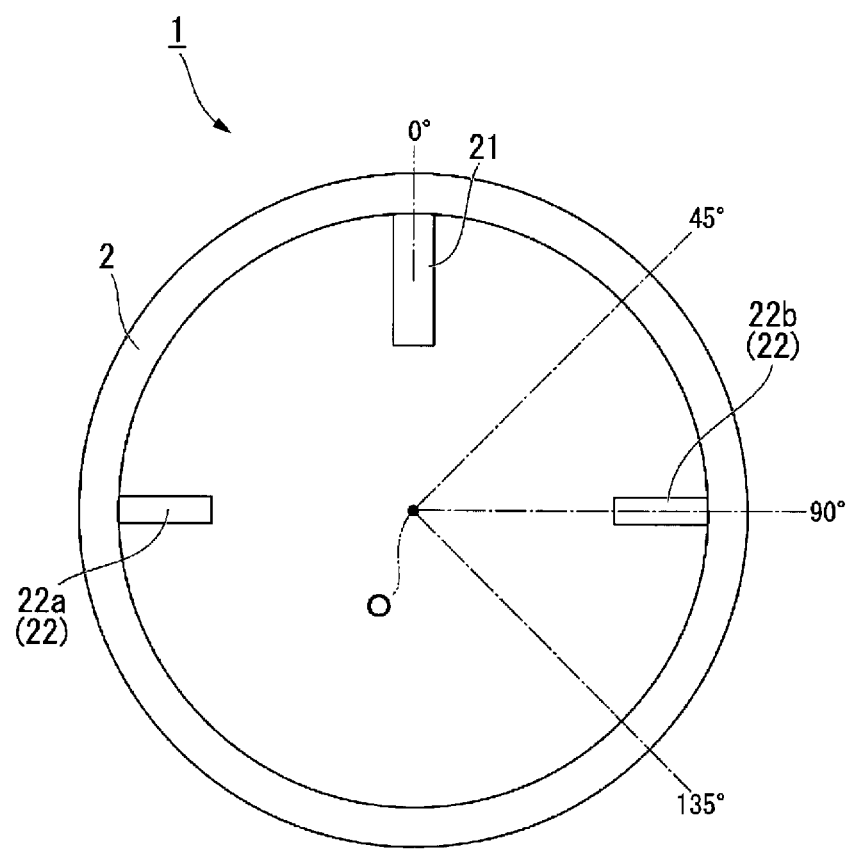
FIG. 8 is a diagram illustrating another modified example of the main steam valve according to the second embodiment of the present invention.

Further, as illustrated in FIG. 8, it is preferable that the near-side plate portion 22a and the deep-side plate portion 22b be provided at positions in the circumferential direction within a range of 45° to 135° with respect to the first plate portion 21, when viewed from the cross line C direction. More preferably, the near-side plate portion 22a and the deep-side plate portion 22b are provided at positions in the circumferential direction within a range from 80° to 100°. Most preferably, the near-side plate portion 22*a* and the deep-side plate portion 22*b* are provided at positions in the circumferential direction that are at 90° with respect to the first plate portion 21.

This configuration, as a result of the swirling vortex flow being elongated in the circumferential direction of the cross line C, reduces the density of the vortex. As a result, the swirling vortex flow can be weakened to the greatest extent.

Although embodiments of the present invention have been described above in detail, the present invention is not limited to those embodiments, and some design changes and the like may also be made to the present invention without departing from the technical concept of the present invention.

Further, although, in the above-described embodiments, a configuration has been described in which the main steam valve 1 is provided in the steam turbine plant 100, the present invention is not limited to this configuration. The main steam valve 1 may be provided in other apparatuses, such as a steam engine.

REFERENCE SIGNS LIST

1 Main steam valve
2 Casing
3 Valve body
3*a* Valve head portion
4 Valve shaft
5 Valve seat
6 Guide
6*a* Outer circumferential surface
7 Valve chamber
7*a* Inner circumferential surface
8 Opening
9 Holding member
10 Inflow port
11 Outflow port
12 Fluid flow path (flow path)
21 First plate portion (baffle plate)
22 Second plate portion (baffle plate)
22*a* Near-side plate portion (second plate portion)
22*b* Deep-side plate portion (second plate portion)
100 Steam turbine plant
101 Steam turbine
102 Rotor
103 Steam supply pipe
104 Steam discharge pipe
F Fluid (steam)
O Axis
C Cross line

The invention claimed is:

1. A main steam valve comprising:
a cylindrical guide extending centered about an axis;
a valve body disposed inside the guide so as to be slidable in an axis direction;
a valve shaft on which the valve body moves in the axis direction between an open position and a closed position;
a casing having a flow path formed therein and having a valve seat formed on an inner surface thereof, the flow path guiding out, in an outflow direction that intersects an inflow direction, a fluid guided into the casing from the inflow direction along the axis direction, the valve body abutting against the valve seat when the valve body is in the closed position; and a valve chamber formed inside the casing, the valve chamber having a baffle plate provided in a region between an outer circumferential surface of the guide and an inner surface of the casing, the baffle plate interrupting a swirling vortex flow with spiral vortex core that extends in a circumferential direction of the axis of the guide, wherein
the baffle plate includes a first plate portion that extends in the outflow direction of the fluid in a region of the valve chamber that is between the outer circumferential surface of the guide and the inner surface of the casing and that is on an opposite side in the outflow direction of the fluid,
an end portion of the first plate portion on an inner side in a radial direction forms a gap with the outer circumferential surface of the guide, and
the end portion of the first plate portion on the inner side in the radial direction is inclined so as to be closer to the outer circumferential surface of the guide toward a deep side in the inflow direction.

2. A steam turbine comprising the main steam valve according to claim 1.

3. The main steam valve according to claim 1, wherein the baffle plate includes a second plate portion that extends in a direction orthogonal to the axis direction, in a width direction that intersects the inflow direction and the outflow direction of the fluid, in the region of the valve chamber between the outer circumferential surface of the guide and the inner surface of the casing.

4. The main steam valve according to claim 3, wherein the second plate portion includes at least one of a near-side plate portion formed only on a near side in the inflow direction of the fluid or a deep-side plate portion formed only on the deep side in the inflow direction of the fluid.

5. The main steam valve according to claim 3, wherein the second plate portion is provided at a position in the circumferential direction around the axis within a range from 45° to 130° with respect to a position at which the first plate portion is disposed.

6. The main steam valve according to claim 3, wherein the second plate portion is provided at a position in the circumferential direction around the axis within a range from 80° to 100° with respect to the position at which the first plate portion is disposed.

7. The main steam valve according to claim 3, wherein the second plate portion is provided at a position in the circumferential direction around the axis that is at 90° with respect to the position at which the first plate portion is disposed.

8. The main steam valve according to claim 3, wherein the second plate portion includes a near-side plate portion formed only on a near side in the inflow direction of the fluid and a deep-side plate portion formed only on the deep side in the inflow direction of the fluid, and
the near-side plate portion is provided on one side in the circumferential direction of the axis with respect to a position at which the first plate portion is disposed, and
the deep-side plate portion is provided on the other side in the circumferential direction of the axis with respect to the position at which the first plate portion is disposed.

9. The main steam valve according to claim 8, wherein positions of the near-side plate portion and the deep-side plate portion partially overlap with each other in the axis direction.

10. A main steam valve comprising:
a cylindrical guide extending centered about an axis;
a valve body disposed inside the guide so as to be slidable in an axis direction;

a valve shaft on which the valve body moves in the axis direction between an open position and a closed position;

a casing having a flow path formed therein and having a valve seat formed on an inner surface thereof, the flow path guiding out, in an outflow direction that intersects an inflow direction, a fluid guided into the casing from the inflow direction along the axis direction, the valve body abutting against the valve seat when the valve body is in the closed position; and a valve chamber formed inside the casing, the valve chamber having a baffle plate provided in a region between an outer circumferential surface of the guide and an inner surface of the casing, the baffle plate interrupting a swirling vortex flow with spiral vortex core that extends in a circumferential direction of the axis of the guide, wherein the baffle plate includes a first plate portion that extends in the outflow direction of the fluid in a region of the valve chamber that is between the outer circumferential surface of the guide and the inner surface of the casing and that is on an opposite side in the outflow direction of the fluid, an end portion of the first plate portion on an inner side in a radial direction forms a gap with the outer circumferential surface of the guide, and the end portion of the first plate portion on the inner side in the radial direction is inclined so as to separate further away from the outer circumferential surface of the guide toward a deep side in the inflow direction.

11. A main steam valve comprising:

a cylindrical guide extending centered about an axis;

a valve body disposed inside the guide so as to be slidable in an axis direction;

a valve shaft on which the valve body moves in the axis direction between an open position and a closed position;

a casing having a flow path formed therein and having a valve seat formed on an inner surface thereof, the flow path guiding out, in an outflow direction that intersects an inflow direction, a fluid guided into the casing from the inflow direction along the axis direction, the valve body abutting against the valve seat when the valve body is in the closed position; and a valve chamber formed inside the casing, the valve chamber having a baffle plate provided in a region between an outer circumferential surface of the guide and an inner surface of the casing, the baffle plate interrupting a swirling vortex flow with spiral vortex core that extends in a circumferential direction of the axis of the guide, wherein the baffle plate includes a first plate portion that extends in the outflow direction of the fluid in a region of the valve chamber that is between the outer circumferential surface of the guide and the inner surface of the casing and that is on an opposite side in the outflow direction of the fluid, the baffle plate includes a second plate portion that extends in a direction orthogonal to the axis direction, in a width direction that intersects the inflow direction and the outflow direction of the fluid, in the region of the valve chamber between the outer circumferential surface of the guide and the inner surface of the casing, the second plate portion includes a near-side plate portion formed only on a near side in the inflow direction of the fluid and a deep-side plate portion formed only on the deep side in the inflow direction of the fluid, the near-side plate portion is provided on one side in the circumferential direction of the axis with respect to a position at which the first plate portion is disposed, and the deep-side plate portion is provided on the other side in the circumferential direction of the axis with respect to the position at which the first plate portion is disposed, and positions of the near-side plate portion and the deep-side plate portion do not overlap with each other in the axis direction.

* * * * *